(12) United States Patent
Kaijima et al.

(10) Patent No.: US 8,949,192 B2
(45) Date of Patent: Feb. 3, 2015

(54) TECHNIQUE OF CONTROLLING ACCESS TO DATABASE

(75) Inventors: Soh Kaijima, Kanagawa-ken (JP); Masahiro Ohkawa, Tokyo (JP); Akira Sakaguchi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1583 days.

(21) Appl. No.: 12/254,697

(22) Filed: Oct. 20, 2008

(65) Prior Publication Data

US 2009/0187612 A1 Jul. 23, 2009

(30) Foreign Application Priority Data

Nov. 19, 2007 (JP) .................... 2007-299450

(51) Int. Cl.
*G06F 17/00* (2006.01)
*G06F 17/30* (2006.01)

(52) U.S. Cl.
CPC .... *G06F 17/30557* (2013.01); *G06F 17/30575* (2013.01)
USPC ............ 707/662; 707/673; 707/E17.044; 711/114; 711/161

(58) Field of Classification Search
CPC ................................. G06F 17/30557
USPC ............... 707/661, 662, 665, 670, 672, 673, 707/E17.005, E17.014, E17.044; 711/114, 711/161, E12.001
See application file for complete search history.

(56) References Cited

U.S. PATENT DOCUMENTS

| | | | |
|---|---|---|---|
| 5,968,115 A * | 10/1999 | Trout | 718/107 |
| 6,269,382 B1 | 7/2001 | Cabrera et al. | |
| 7,251,661 B1 | 7/2007 | Reed et al. | |
| 7,269,733 B1 * | 9/2007 | O'Toole, Jr. | 713/175 |
| 7,412,489 B2 * | 8/2008 | Nowacki et al. | 709/206 |
| 7,587,428 B2 * | 9/2009 | Barabas et al. | 707/999.201 |
| 2002/0069077 A1 * | 6/2002 | Brophy et al. | 705/1 |
| 2005/0149584 A1 * | 7/2005 | Bourbonnais et al. | 707/204 |
| 2005/0198086 A1 * | 9/2005 | Moore et al. | 707/204 |
| 2006/0053250 A1 * | 3/2006 | Saze | 711/114 |
| 2006/0074916 A1 | 4/2006 | Beary et al. | |
| 2006/0112107 A1 * | 5/2006 | Jones | 707/10 |
| 2006/0129537 A1 | 6/2006 | Torii et al. | |
| 2009/0193025 A1 * | 7/2009 | Iwamoto | 707/8 |

FOREIGN PATENT DOCUMENTS

| | | |
|---|---|---|
| JP | 2000112983 | 4/2000 |
| JP | 2000-250789 A | 9/2000 |
| JP | 2000250789 A1 | 9/2000 |
| JP | 2006164211 A1 | 6/2006 |
| JP | 2007-272721 A | 10/2007 |
| JP | 2007272721 A1 | 10/2007 |

* cited by examiner

*Primary Examiner* — Anh Ly
(74) *Attorney, Agent, or Firm* — Steven L. Nichols; Van Cott, Bagley, Cornwall & McCarthy P.C.

(57) ABSTRACT

A method of controlling access to a database includes autonomously archiving data within a database from a first storage device into a second storage device, according to an archive condition; the archive condition being input in conjunction with the data and being associated with the data; accepting an input of an access command to the database; determining whether data to be accessed in response to the access command input has already been archived in the second storage device based on the access command and the archive condition; and accessing data included in the database or data archived in the second storage device according to the access command based on the determination.

20 Claims, 17 Drawing Sheets

150

| TABLE : USER1. T1 ||
|---|---|
| C1 (Date) | C2 (Char) |
| ⋮ | ⋮ |
| 1999-06-15 | AAA1 |
| 2000-08-22 | AAA2 |
| 2002-12-01 | AAA3 |
| ⋮ | ⋮ |

| TABLE : USER1. T1_WORM ||
|---|---|
| C1 (Date) | C2 (Char) |
|  |  |

FIG. 5

| | |
|---|---|
| BASE TABLE : | USER1. T1 |
| ARCHIVE DESTINATION TABLE : | USER1. T1_WORM |
| ARCHIVE CONDITION : | C1 <= '1999-12-31' (range_key: 'C1', ending '1999-12-31') |
| READ ONLY : | YES |
| ATTACH VALIDITY ATTRIBUTE : | VALID |

TABLE : USER1. T1 — 150

| C1 (Date) | C2 (Char) |
|---|---|
| ⋮ | ⋮ |
| ~~1999-06-15~~ | ~~AAA1~~ |
| 2000-08-22 | AAA2 |
| 2002-12-01 | AAA3 |
| ⋮ | ⋮ |

TABLE : USER1. T1_WORM — 160

| C1 (Date) | C2 (Char) |
|---|---|
| ⋮ | ⋮ |
| 1999-06-15 | AAA1 |
| ⋮ | ⋮ |

SELECT * FROM T1 WHERE C1 > '1900-01-01'

(b)

SELECT * FROM (SELECT * FROM USER1.T1 UNION ALL SELECT * FROM USER1.T1_WORM) WHERE C1 > '1900-01-01'

(c)

UPDATE T1 SET C1 = '2000-10-10' WHERE C2 = 100

(d)

UPDATE USER1. T1 SET C1 = '2000-10-10' WHERE C2 = 100

(e)

INSERT INTO USER1.T1 (C1,C2,C3) SELECT '2000-10-10',C2,C3 FROM USER1..T1_WORM WHERE C2 = 100

(f)

DELETE FROM USER1.T1_WORM WHERE C2 = 100

FIG. 10

BASE TABLE : USER1.T1
ARCHIVE DESTINATION TABLE : USER1.T1_WORM
ARCHIVE CONDITION : C1 <= '2000-12-31' (range_key: 'C1', ending '2000-12-31')
READ ONLY : YES
ATTACH VALIDITY ATTRIBUTE : VALID

FIG. 12

```
                                    ┌─150
TABLE : USER1. T1
| C1 (Date)   | C2 (Char) |
| ----------- | --------- |
| ~~1999-06-15~~ | ~~AAA1~~ |
| ~~2000-08-22~~ | ~~AAA2~~ |
| 2002-12-01  | AAA3      |

```
                                    ┌─160
TABLE : USER1. T1_WORM
| C1 (Date)   | C2 (Char) |
| ----------- | --------- |
| 1999-06-15  | AAA1      |
| 2000-08-22  | AAA2      |

| | | 110 |
|---|---|---|
| BASE TABLE : | USER1. T1 | |
| ARCHIVE DESTINATION TABLE : | USER1. T1_WORM | |
| ARCHIVE CONDITION : | C1 >= '2000-01-01'  AND C1 <= '2004-12-31'  (range_key: 'C1' , starting '2000-01-01' ending '2004-12-31') | |
| READ ONLY : | YES | |
| ATTACH VALIDITY ATTRIBUTE : | VALID | |
| BASE TABLE : | USER1. T1 | |
| ARCHIVE DESTINATION TABLE : | USER1. T1_WORM2 | |
| ARCHIVE CONDITION : | C1 <= '1999-12-31'  (range_key: 'C1' , ending '1999-12-31') | |
| READ ONLY : | YES | |
| ATTACH VALIDITY ATTRIBUTE : | VALID | |

FIG. 17

TABLE : USER1. T1 — 150

| C1 (Date) | C2 (Char) |
|---|---|
| ⋮ | ⋮ |
| ~~1999-06-15~~ | ~~AAA1~~ |
| ~~2000-08-22~~ | ~~AAA2~~ |
| ~~2002-12-01~~ | ~~AAA3~~ |
| ⋮ | ⋮ |

TABLE : USER1. T1_WORM — 160

| C1 (Date) | C2 (Char) |
|---|---|
| ⋮ | ⋮ |
| ~~1999-06-15~~ | ~~AAA1~~ |
| 2000-08-22 | AAA2 |
| 2002-12-01 | AAA3 |
| ⋮ | ⋮ |

C1 >= '2000-01-01'
AND
C1 <= '2004-12-31'  — 148

FIG. 19

TECHNIQUE OF CONTROLLING ACCESS TO DATABASE

BACKGROUND

In modern computing systems, large quantities of data need to be stored for later retrieval and archival purposes. A variety of storage mediums, each with its own particular advantages and limitations, can be used to store this data. For example, a hard drive or array of hard drives may provide relatively fast access to stored data. However, the storage space provided by hard drives may be relatively expensive, limited in capacity, and be susceptible to erasure or tampering. Another example of a storage medium is magnetic tape storage. Magnetic tapes have traditionally been less expensive than hard drive storage and very efficient in storing large quantities of data. Magnetic tapes can also have the advantage of being less susceptible to accidental erasure or tampering. However, the inherent linear nature of magnetic tapes can significantly delay access to desired data. For example, when data is requested that is stored on a magnetic tape, the magnetic tape must be loaded into a tape drive and the tape moved to the location on the tape where the desired data is stored.

By utilizing several different kinds of storage medium within a computer system, the advantages of each storage type can be realized and the weaknesses minimized. For example, hard drive storage could be utilized to store commonly accessed data and magnetic tape drives could be used to archive rarely accessed or sensitive data. In this manner, the limited space of a hard drive could be efficiently utilized to provide quick access to commonly used data, and the larger capacity of the tape drive could be used to archive less frequently used data and back up hard drive contents. As the hard drive capacity is filled up, less frequently used data could be transferred to tape drive storage. Additionally, the more secure, less accessible nature of tape drives can be utilized to comply with the government mandated storage of financial and corporate records.

However, managing and accessing data that is distributed across several storage types can be challenging. Ideally, the distributed storage database would be relatively transparent to the users, secure, and easy to access. Additionally, the computer system should require little, if any, human intervention in managing and accessing data.

SUMMARY

According to a first aspect of the present specification, there is provided a system for controlling access to a database, which includes a data archive module configured to archive that data in a database stored in a first storage device which satisfies an archive condition input by a user in a second storage device, a command input module configured to accept an input of an access command to the database, an archive determining module configured to determine whether data to be accessed in response to the access command input has already been archived in the second storage device, based on the input access command and the input archive condition, and an access module configured to access data included in the database or data archived in the second storage device according to the access command based on determination made by the archive determining module. There are also provided a method of controlling access to a database using the system, and a program which causes a computer to function as the system.

BRIEF DESCRIPTION OF THE DRAWINGS

FIG. 4 shows an example of a database stored in a first storage device, according to one embodiment of principles described herein.

FIG. 5 shows an example of a virtual table created in association with a second storage device, according to one embodiment of principles described herein.

FIG. 6 shows an archive condition and association information after data archiving, which are stored in a control storage device, according to one embodiment of principles described herein.

FIG. 7 shows an example of a database after data archiving, which is stored in the first storage device, according to one embodiment of principles described herein.

FIG. 8 shows an example of a virtual table after data archiving, which is stored in the second storage device, according to one embodiment of principles described herein.

FIG. 10 shows an example of an access command which is rewritten by an access module, according to one embodiment of principles described herein.

FIG. 12 shows an archive condition and association information after additional data archiving, which are stored in the control storage device, according to one embodiment of principles described herein.

FIG. 13 shows an example of a database after additional data archiving, which is stored in the first storage device, according to one embodiment of principles described herein.

FIG. 14 shows an example of a virtual table after additional data archiving, which is stored in the second storage device, according to one embodiment of principles described herein.

FIG. 17 shows an archive condition and association information after archiving data in another newly created table, which is stored in the control storage device, according to one embodiment of principles described herein.

FIG. 18 shows an example of a database after archiving data in another newly created table, which is stored in the first storage device, according to one embodiment of principles described herein.

FIG. 19 shows an example of a database after archiving data in another newly created table, which is stored in the second storage device, according to one embodiment of principles described herein.

DETAILED DESCRIPTION

Figure 1:
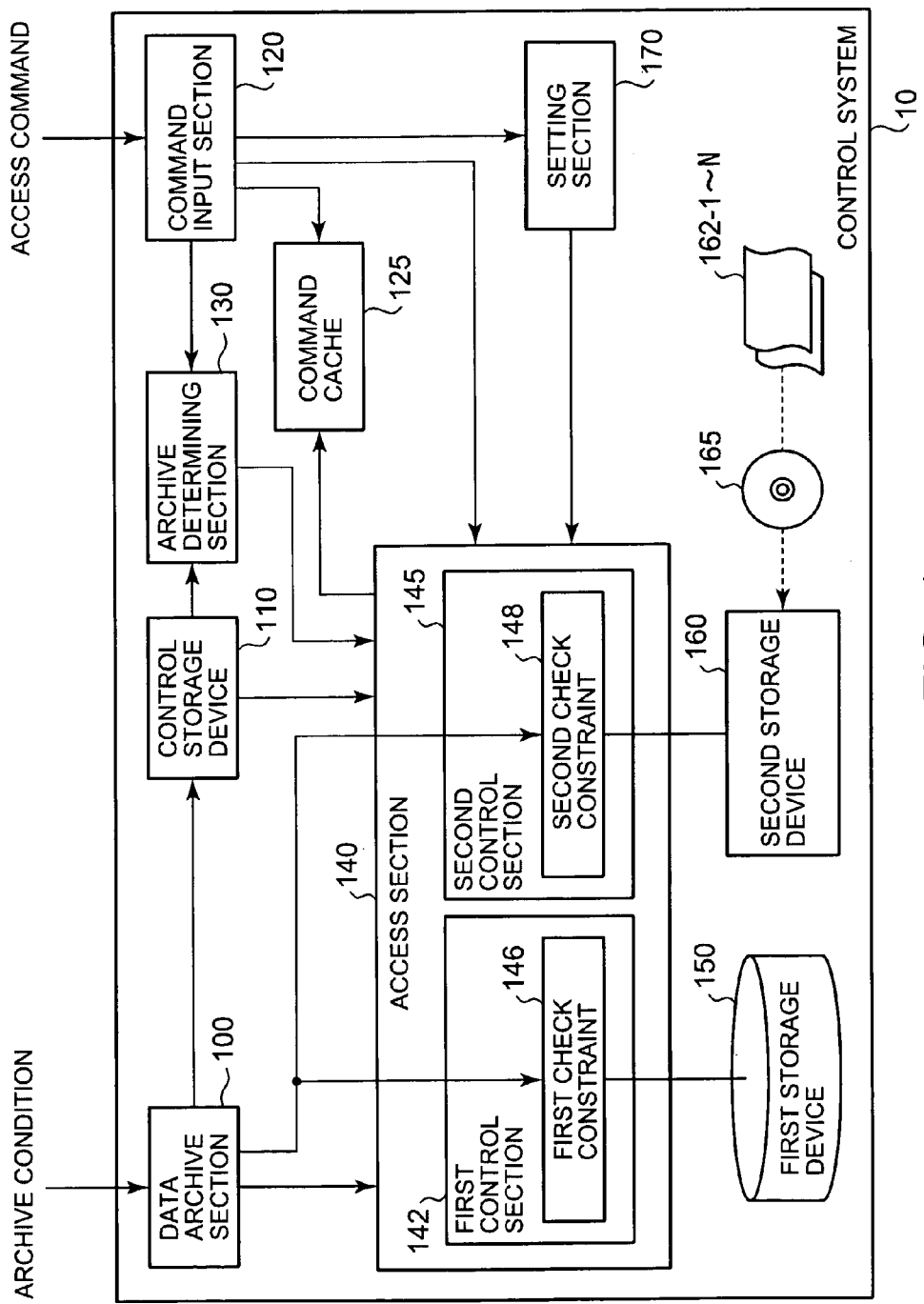
FIG. 1 shows the functional configuration of an illustrative control system, according to one embodiment of principles described herein.

The present specification relates to a technique of controlling access to a database. Particularly, the present specification relates to a technique of controlling access to a database stored in a plurality of storage devices. In some circumstances, a database may include a high-speed storage medium, such as a hard drive, and a low-speed storage medium, such as a linear tape drive. One method of efficiently accessing this type of database has been proposed in Japanese Unexamined Patent Publication (Kokai) No. 2000-112983, hereinafter referred to as "Patent Document 1". This method can efficiently access a database by storing data having a high frequency of retrieval in a high-speed storage medium and data having a low frequency of retrieval in a low-speed storage medium.

However, to access a low-speed storage medium (e.g., magnetic tape) in the technique of Patent Document 1, data in the storage medium is restored in a high-speed storage medium (e.g., hard disk drive). Accordingly, there is a waiting time from issuance of a data retrieval instruction to a time when data becomes accessible.

Increasingly data needs to be saved in an unchangeable form for a long period of time from a viewpoint of supporting companies' compliance with various laws and accounting procedures. In this case, a user selects a part of data stored in a hard disk drive or the like and archives it in a so-called WORM (Write Once Read Many) medium or the like. A WORM medium can only be written to once and the data cannot be changed once it is written. Consequently, the WORM medium can be a secure, long term method of archiving information which prevents erasure and tampering. When the free space of a hard disk drive becomes small, a part of data stored therein may be archived in a WORM medium. If such a WORM medium can be referenced as a part of database, the hard disk drive need not keep storing the archived data, thereby increasing the available hard disk drive capacity and increasing the efficiency of the computer system.

Accordingly, it is an object of the present specification to provide a system, a method and a program, which can archive the necessary data from a high-speed storage medium to a low-speed storage medium and manage access to data which is distributed over multiple storage mediums of various types and access speeds.

According to one illustrative embodiment, a distributed storage database receives data that is accompanied by an archive condition input by a user. The distributed storage database interprets the archival condition, stores the data, and records the storage location on one or more tables. When an access command is received by the distributed storage database, a determination of the storage location is made by referencing the tables. The data is then accessed, subject to other constraints such as security conditions, from the various storage locations and presented to the requester. Security conditions may be implemented which allow a requestor to access the portion of the request which are not restricted or which ignore requests which contain restricted content.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows the functional configuration of a control system 10 according to the embodiment. The control system 10 has a first storage device 150 which is implemented by, for example, a hard disk drive or the like, and a second storage device 160 which is implemented by, for example, a tape storage device, a magneto-optical disk drive or the like. Alternatively, the second storage device 160 may be a special-purpose device for storing data for a long period of time, such as DR550 available from IBM Corporation.

The control system 10 archives a part of a database stored in the first storage device 150 in the second storage device 160 according to a data archive instruction received from a user. The control system 10 according to the embodiment is intended to adequately access the first storage device 150 and/or the second storage device 160 in response to an access command received from the user even after such data archiving.

The control system 10 has a control storage device 110 which is implemented by a main storage device like a RAM, and a command cache 125. In the control system 10, an arithmetic unit, such as a CPU or a microcomputer, reads a program from the main storage device like a RAM and executes the program so that the control system 10 functions as a data archive module 100, a command input module 120, an archive determining module 130, an access module 140 and a setting module 170. The program may be developed by expanding the functions of a DB2 server of IBM Corporation. A second control module 145 for the program may be developed by using a non-relational wrapper SDK of a Federation Server of IBM Corporation.

The data archive module 100 archives data in a database stored in the first storage device 150 which satisfies an archive condition input by the user in the second storage device 160. Specifically, the first storage device 150 stores a database with a table structure, for example. This table is called "first table". Then, the data archive module 100 accepts inputs of the name of a column in the first table and the range of possible values of the column, as an archive condition. Then, the data archive module 100 reads a record where the column takes a value in that range from the first table.

Then, the data archive module 100 creates a new second table including the read record and stores the second table in the second storage device 160. The second storage device 160 stores the new second table in a WORM medium 165 which is, for example, a magneto-optical disk. The second table may be stored in the form of a plurality of files 162-1 to 162-N dispersed in the WORM medium 165. In addition, the data archive module 100 deletes the read record from the first table. The data archive module 100 stores in the control storage device 110 an archive condition input to archive data.

The control storage device or module 110 is provided to store various kinds of control data, such as the archive condition. For example, an archive condition to be stored is a set of the column name of a column for which the condition is to be set, and the range of values which data in the column should satisfy. The archive condition may be a combination of a plurality of columns and the range of values which data in those columns should satisfy.

The command input module 120 accepts an input of an access command to the database. For example, the access command includes the type of access, designation of a table to be accessed, and a condition which a record to be accessed satisfies. The type of access is reference, update, insertion or the like. As an example, the access command may be described by a language like SQL (Structured Query Language).

The archive determining module 130 determines whether data to be accessed in response to the input access command has already been archived in the second storage device 160, based on the input access command and the input archive condition. Specifically, first, the archive determining module 130 reads an archive condition from the command input module 120 according to the input of the access command. Then, the archive determining module 130 determines whether data to be accessed in response to the access command satisfies the archive condition.

On condition that data to be accessed in response to the access command satisfies the archive condition, the archive determining module 130 determines that the data has already been archived in the second storage device 160. As a specific example, in a case where the archive condition is that the value of one column is equal to or greater than a constant of "10000," if the condition included in the access command is that the value of the column is equal to or greater than a constant of "20000," it is determined that data to be accessed has already been archived.

On the other hand, in the same case where the archive condition is that the value of one column is equal to or greater than a constant of "10000," if the condition included in the access command is that the value of the column is equal to or smaller than a constant of "9000," it is determined that data to be accessed has not been archived yet. Further, in the same case where the archive condition is that the value of one column is equal to or greater than a constant of "10000," if the condition included in the access command is that the value of the column is equal to or greater than a constant of "5000," it is determined that data to be accessed has partially been archived. In this manner, the archive determining module 130 may determine whether a part of data has been archived.

Based on the determination by the archive determining module 130, the access module 140 accesses data stored in the first storage device 150 and/or data archived in the second storage device 160. Specifically, the access module 140 may access the first storage device 150 or the second storage device 160 by rewriting the input access command. As one example, when data to be accessed has already been archived in the second storage device 160, the access module 140 may rewrite designation of a table to be accessed in the access command from the first table in the first storage device 150 to the second table in the second storage device 160.

As another example, when data to be accessed extends over both the first storage device 150 and the second storage device 160, the access module 140 may rewrite designation of a table to be accessed in the access command from the first table to a table which is formed by coupling the first table and the second table together. When an access command is written by the SQL, such table coupling is represented by a command "UNION ALL". Accordingly, it is possible to adequately access both a database in the first storage device 150 and already archived data.

The access module 140 has a basic function which compiles an access command described by the SQL to translate to a command directly interpretable by the first storage device 150 or the second storage device 160, and then issues the compiled command to the first storage device 150 and the second storage device 160. To make such a compiling process efficient, the command cache 125 stores an access command input in the past and a compiled command or a command acquired by compiling the access command and issued to the database by the access module in association with each other.

The compiled command is a so-called access plan showing which information should be acquired from which storage device as well as which processes should be executed in what order. The example will be illustrated below.

Step 1: Acquire data with values of column A ranging from 5000 to 10000 from the first storage device 150.

Step 2: Acquire data with values of column A of 10000 or greater from the second storage device 160.

Step 3: (Hereinafter, the processing likewise continues.)

When an access command newly input by the command input module 120 is already stored in the command cache 125, the access module 140 reads a compiled command stored in the command cache 125 in association with the access command. In this case, the access module 140 sequentially executes a plurality of processes indicated by the read compiled command without re-compiling the access command. As a result, the first storage device 150 and the second storage device 160 are accessed as needed. This eliminates the need for a compiling process for some commands that have already been cached, so that a waiting time from issuance of a command to completion of access can be shortened.

It is noted, however, that when the data archive module 100 has newly archived data, even if the command input module 120 has accepted inputs of the same access command before and after the archiving, compiled commands which are actually issued by the access module 140 may differ from each other. Therefore, according to one illustrative embodiment, the data archive module 100 clears at least a portion of the command cache 125 every time data is archived. A portion to be cleared is desirably a portion relating to the newly input archive condition.

The setting module 170 sets, for each user, whether or not to permit access to data already archived in the second storage device 160. In a case where access to archived data is not permitted for a user 1, for example, the access module 140 returns an error even when the user 1 issues an access command to the archived data. Also, even when the user 1 inputs an access command specifying the second table as an access target, the access module 140 returns an error.

Alternatively, in a case where access to archived data is not permitted, the access module 140 may disregard the archived data and access only accessible data when the user 1 issues an access command to the archived data. For example, in a case where a part of data has been archived in a table T2 from a table T1, when a command "SELECT*FROM T1" is issued, the data archived in the table T2 may be disregarded and only the data archived in the table T1 may be accessed.

Access to the first storage device 150 and the second storage device 160 may be realized together with a function "check constraint" of the access module 140 as well as rewriting of an access command. Specifically, the access module 140 has a first control module 142 and a second control module 145.

The first control module 142 is provided in association with the first storage device 150. The first control module 142 determines whether data to be accessed in response to the input access command satisfies a first check constraint, permits access to the first table on condition that the data satisfies the check constraint, and inhibits access to the first table on condition that the data does not satisfy the check constraint.

The second control module 145 is provided in association with the second storage device 160. The second control module 145 determines whether data to be accessed in response to the input access command satisfies a second check constraint, permits access to the second table on condition that the data satisfies the check constraint, and inhibits access to the second table on condition that the data does not satisfy the check constraint.

That is, an access condition included in the access command is sequentially compared with the first and second check constraints, and when either of the constraints is satisfied, a storage device corresponding to the satisfied check constraint is automatically selected and access to the storage device succeeds. For example, if the first check constraint is "column C1<1000", the second check constraint is "column C1>=1000" and an access condition part in an input SQL-based SELECT command or the like is "C1<2000", all corresponding data is acquired from the first storage device 150, and data having the column C1 of less than 2000 is acquired from the second storage device 160. If an access condition part in a command referring to information is "column C1<500", data having the column C1<500 is acquired from the first storage device 150, and no data is acquired from the second storage device 160.

If none of the check constraints is satisfied, an error indicating an access failure is returned. When the input command indicates reference to information (SQL SELECT statement) and there is no corresponding data, the process will be terminated normally without any record. When the input command is insertion of information, an error is issued unless only one of the constraints is satisfied. Further, update or deletion becomes an error if there is no corresponding data. Those conditions for occurrence of an error may be determined depending on the specification of an existing database.

The access module 140 accesses adequate data in each of the first storage device 150 and the second storage device 160 using those check constraints. Specifically, at the time of data archiving, the data archive module 100 sets the input archive condition as the second check constraint in the second check constraint storage module 148 of the second control module 145. Then, the data archive module 100 sets logical negation of the input archive condition as the first check constraint in the first check constraint storage module 146 of the first control module 142. As mentioned above, the access module 140 rewrites designation of a table to be accessed in the input access command with a table which is formed by coupling the first table and the second table together. Then, for an access command to be input thereafter, either one or both of the first storage device 150 and the second storage device 160 are adequately selected as an access target according to an access condition included in the access command.

Figure 2:
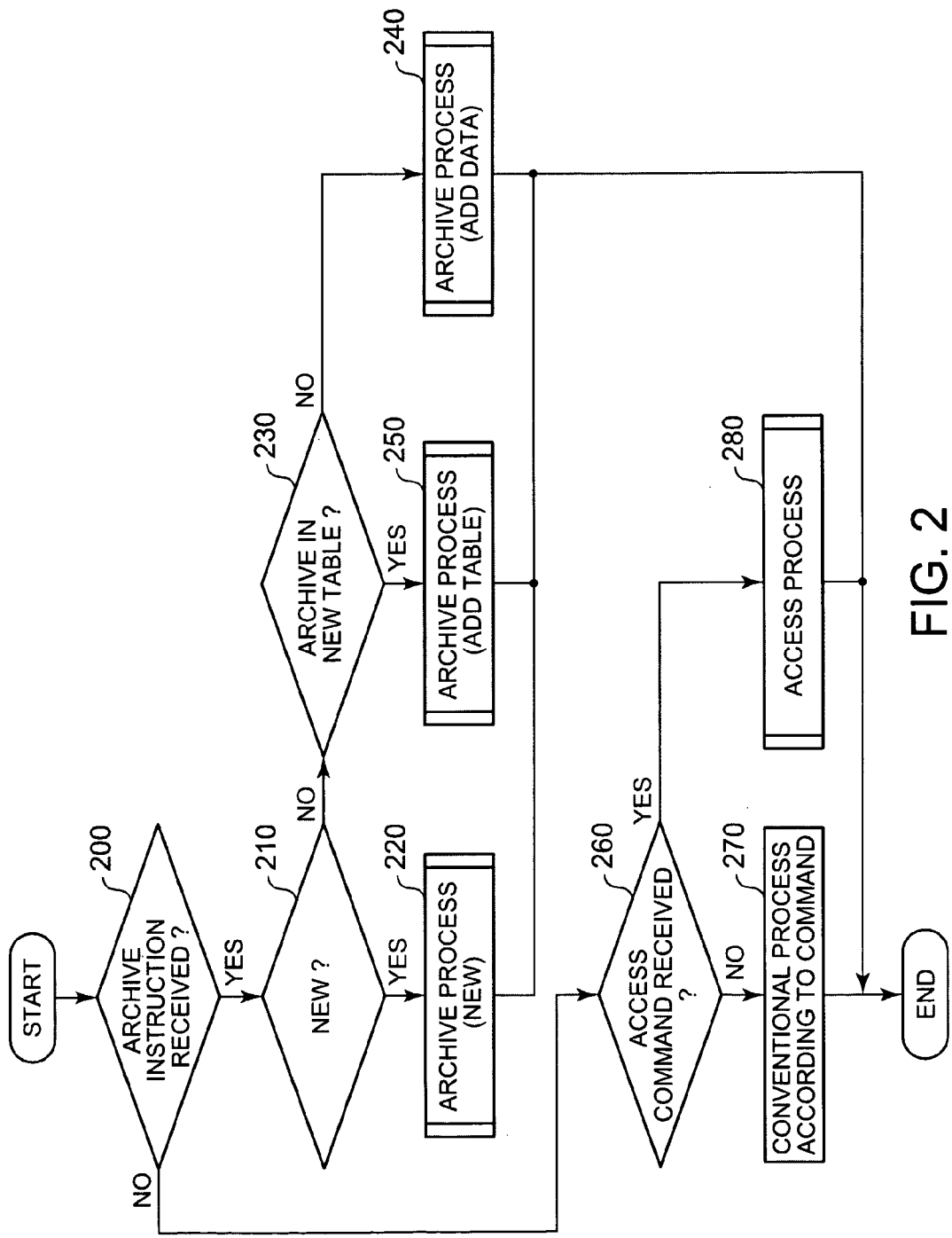
FIG. 2 shows the flow of the process of the control system to archive data from a database and access the archived data, according to one embodiment of principles described herein.

FIG. 2 shows the flow of the process of the control system 10 according to the embodiment to archive data from a database and access the archived data. First, the data archive module 100 determines whether an instruction to archive a part of the database stored in the first storage device 150 in the second storage device 160 has been received (S200). The archive instruction includes, for example, a table in a database to be an archive origin (T1 in the embodiment), an archive condition (e.g., a column and the range of the values thereof), and setting on whether or not data in an archive destination is to be read only.

In response to the archive instruction received (S200: YES), the data archive module 100 determines whether the archive instruction is new for the table of the archive origin, i.e., whether no data has been archived from the table of the archive origin in the past (S210). When the archive instruction is new (S210: YES), the data archive module 100 archives data satisfying the archive condition input by the user in the second storage device 160 (S220). A specific example of this process will be explained with reference to FIGS. 3 to 8.

Figure 3:
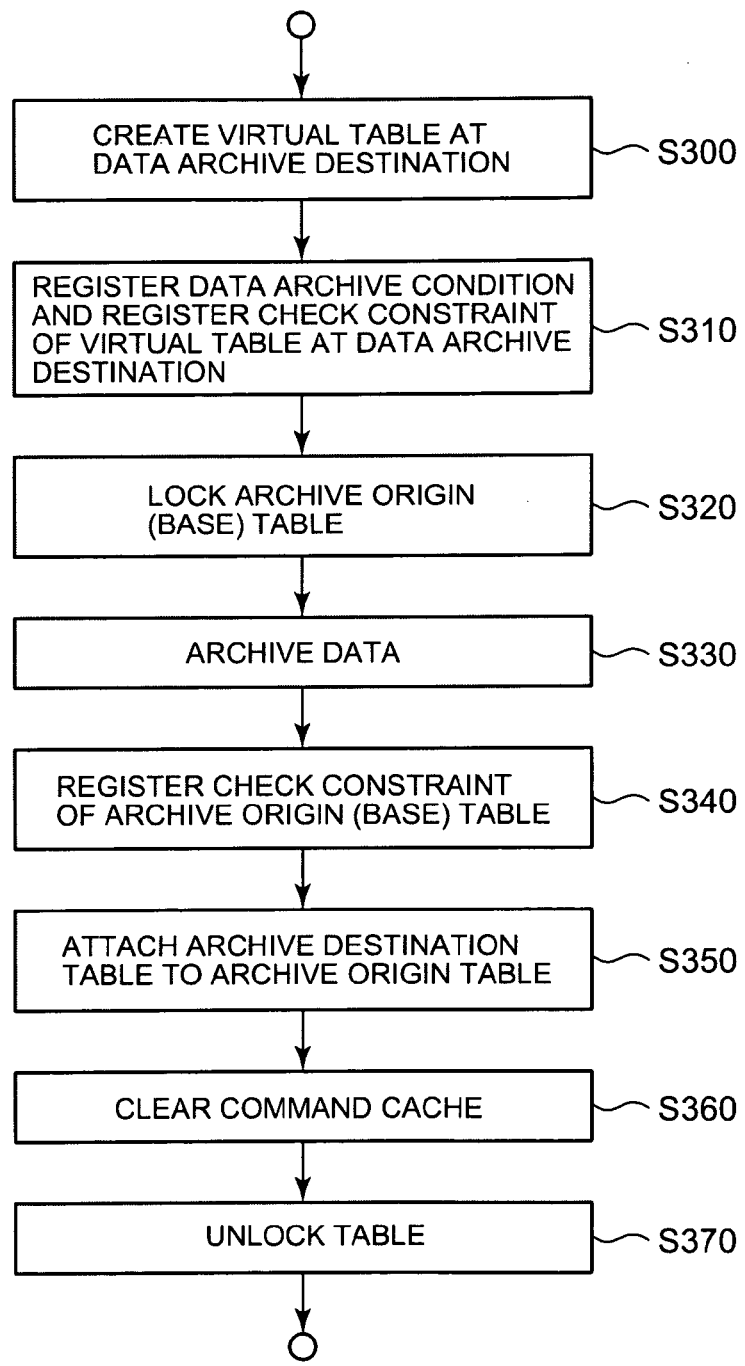
FIG. 3 shows the details of the flow of a process in S220 in FIG. 2, according to one embodiment of principles described herein.

FIG. 3 shows the details of the flow of the process in S220 in FIG. 2. FIG. 4 shows an example of the database stored in the first storage device 150 according to the embodiment. At the beginning of the process in FIG. 3, a database with a table structure, e.g., a relational database, is stored in the first storage device 150 as shown in FIG. 4.

A table T1 is stored in the first storage device 150. The table T1 includes a column C1 and a column C2. The data type of the column C1 is a date (Date) type, and the data type of the column C2 is a character string (Char) type.

FIG. 4 shows three records in the table T1. The first record includes "1999-06-15" in the column C1, and includes "AAA1" in the column C2. The second record includes "2000-08-22" in the column C1, and includes "AAA2" in the column C2. The third record includes "2002-12-01" in the column C1, and includes "AAA3" in the column C2.

Returning to the description of FIG. 3, first, the data archive module 100 creates a second table for defining the data structure of data archived in the second storage device 160 (S300). This table is called "virtual table". One example of the virtual table is shown in FIG. 5.

FIG. 5 shows an example of a virtual table created in association with the second storage device 160 according to the embodiment. The name of the virtual table is T1_WORM. This virtual table, like the table T1, includes a column C1 and a column C2. The data type of the column C1 is a date (Date) type, and the data type of the column C2 is a character sequence (Char) type. Note that the table T1_WORM includes no records.

For example, if a wrapper to access the second storage device 160 (e.g., DR550 available from IBM Corporation) is developed by using the functions of a Federation Server of IBM Corporation, a virtual table T1_WORM is created by sequentially issuing the following commands to a DB2 server of IBM Corporation. The DR550 can be accessed by using this table. An illustrative example of these commands is given below.

```
create wrapper worm_wrapper library 'db2 qgjava.dll' options
    (unfenced_wrapper_class 'UnfencedTapeWrapper');
create server worm_server wrapper worm_wrapper options (target
'DR550');
create nickname user1.t1_worm for server worm_server options
    (base_schema 'USER1', base_table 'T1', num_worm_file_records
    '100', cache_dir '/var/cache/db1/t1_worm', cache size '1G');
```

Returning to the description of FIG. 3, next, the data archive module 100 registers various kinds of information based on the data archive instruction input (S310). For example, the data archive module 100 sets the input archive condition as the second check constraint in the second control module 145. The data archive module 100 stores the archive condition in the control storage device 110, and stores association information associating the table T1 which is an archive origin with the table T1_WORM which is an archive destination in the control storage device 110. Further, when receiving an instruction to set a read only attribute to data in the archive destination, the data archive module 100 may set the read only attribute to the table T1_WORM. One example of the attribute is shown in FIG. 6.

FIG. 6 shows an archive condition and association information after data archiving, which are stored in the control storage device 110 according to the embodiment. "C1<=1999-12-31" is stored as an archive condition in the control storage device 110. A base table and an archive destination table are stored as association information in the control storage device 110 in association with each other. The base table is USER.T1, and the archive destination table is USER.T1_WORM. Accordingly, the access module 140 can consider an access command to the table T1 as an access command to the table T1 and the table T1_WORM. Further, a read only attribute and an attach validity attribute are stored in the control storage device 110. The read only attribute indicates an access restriction for the archive destination table. The attach validity attribute indicates if association by the association information is valid.

An example of illustrative commands which could implement the foregoing processing on a DB2 server of IBM Corporation, is given below. In this example, it is assumed that the creation of a virtual table of the data archive destination has already been performed as described above.

```
Register data archive condition (various kinds of information shown in
Fig. 6 are defined for T1_WORM)
    alter nickname user1.t1_worm add attach info (base_schema
    'USER1', base_table 'T1', range_key 'C1',
    ending '1999-12-31', readonly 'Y');
Register check constraint of T1_WORM (register the archive condition
registered above as a check constraint)
    alter nickname user1.t1_worm add constraint c1 check
    (c1<='1999-12-31') not enforced;
Lock table T1
    lock table user1.t1 in exclusive mode;
Archive data to be archived in table T1 in table T1_WORM (archive data
using information in Fig. 6)
    archive table user1.t1;
Register check constraint of table T1 (register a reverse condition to the
archive condition in Fig. 6 as a check constraint of the table T1)
    alter table user1.t1 add constraint c1 check (c1>'1999-12-31');
Attach table T1 to table T1_WORM (change an attach validity attribute in
Fig. 6 from "invalid" to "valid")
    alter table user1.t1 attach table user1.t1_worm;
Clear cache of SQL statement relating to table T1 and table T1_WORM
    flush statement cache for table user1.t1;
Settle the setting information and unlock table T1
    commit;
```

The foregoing individual functions may be achieved by a plurality of commands as given above, or may be achieved by a single command for collectively achieve those functions.

The data archive module 100 may divide and save the archived data in a plurality of files in the second storage device 160. These files store partial data, respectively. The partial data satisfy different conditions, respectively. For example, records with the column C1 ranging from 1998-01-01 to 1998-12-31 may be stored in one file, and records with the column C1 ranging from 1997-01-01 to 1997-12-31 may be stored in another file. In this case, the data archive module 100 may store conditions which such partial data should satisfy in the control storage device 110.

Returning to the description of FIG. 3, next, the data archive module 100 locks the database of the archive destination to inhibit access thereto by exclusive control (S320).

Then, the data archive module 100 archives data in the database stored in the first storage device 150 which satisfies the archive condition in the second storage device 160 (S330). The archived data may be encrypted or compressed as needed. The data archive module 100 sets the logical negation of the input archive condition as the first check constraint in the first control module 142 (S340).

The data archive module 100 then attaches the table of the archive origin or archive origin table to the table of the archive destination or archive destination table (S350). "Attach" is to effectively set association information indicating association, and specifically it is to effectively set the attach validity attribute in FIG. 6. In addition, the data archive module 100 clears the command cache 125 (S360). Then, the data archive module 100 unlocks the database to permit access thereto (S370). FIGS. 7 and 8 show examples of the first storage device 150 and the second storage device 160 after data is archived in the second storage device 160 from the first storage device 150 through the foregoing processing.

FIG. 7 shows an example of a database after data archiving, which is stored in the first storage device 150 according to the embodiment. The first storage device 150 stores records with C1 values representing dates after 1999-12-31, and records with C1 values representing dates on and before 1999-12-31 are deleted from the first storage device 150. The first constraint storage module 146 stores "C1>1999-12-31" which is logical negation of the archive condition as the first check constraint.

FIG. 8 shows an example of a database after data archiving, which is stored in the second storage device 160 according to the embodiment. The second storage device 160 stores records with C1 values representing dates on and before 1999-12-31, and records with C1 values representing dates after 1999-12-31 are not archived in the second storage device 160. The second constraint storage module 148 stores "C1<=1999-12-31" which is logical negation of the archive condition as the second check constraint.

Returning to the description of FIG. 2, when an archive instruction is not received, on the other hand, the command input module 120 determines whether an input of an access command to the database has been accepted (S260). In response to the access command received (S260: YES), the access module 140 accesses at least one of the first storage device 150 and the second storage device 160 (S280). One illustrative embodiment of this process is shown in FIG. 9.

Figure 9:
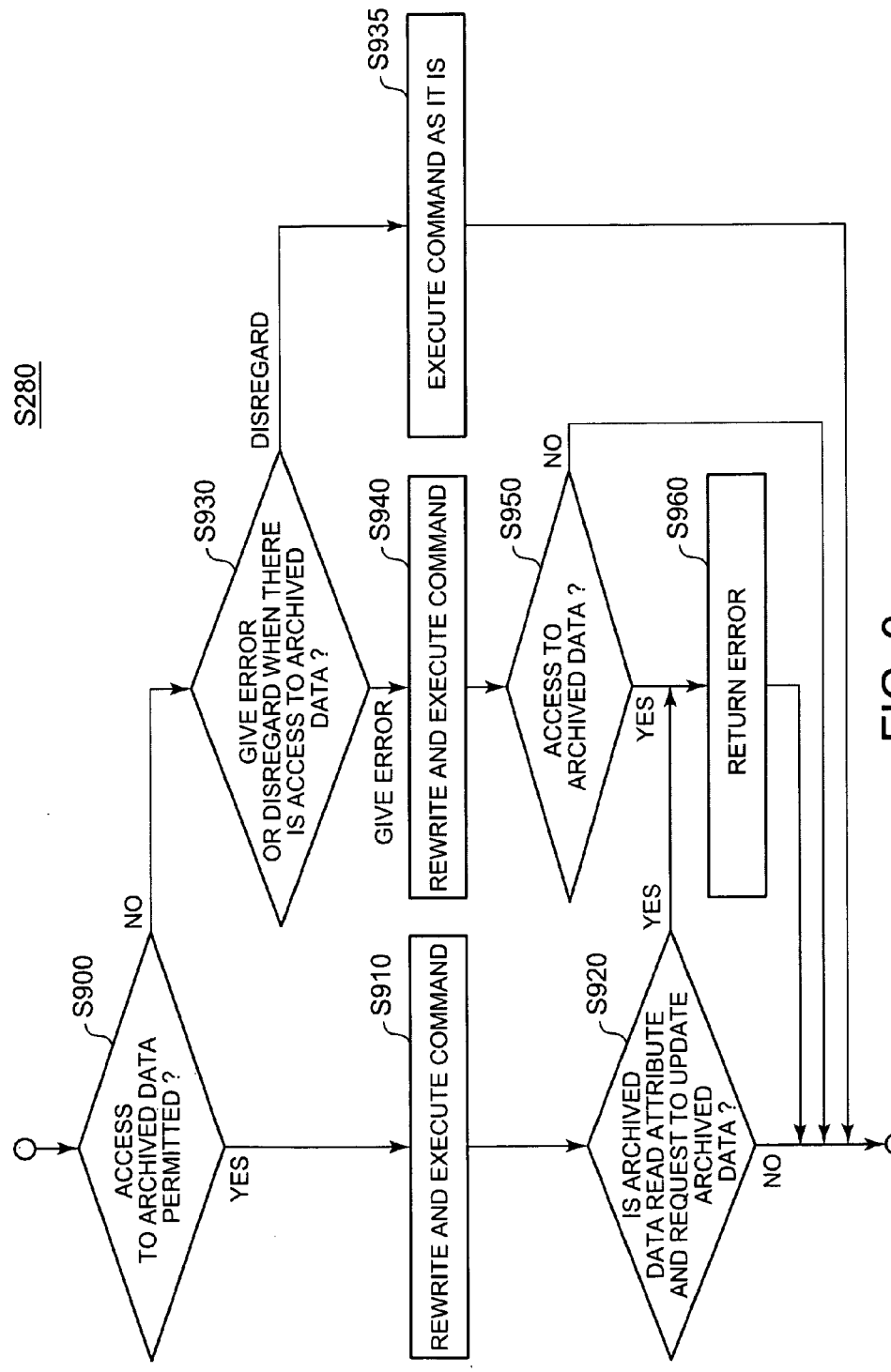
FIG. 9 shows the details of the flow of a process in S280 in FIG. 2, according to one embodiment of principles described herein.

FIG. 9 shows one illustrative flow of the process in S280 in FIG. 2. First, the access module 140 determines whether the user who has issued the access command is permitted to access data at the archive destination or archived data (S900). This permission may be set by the aforementioned setting module 170, which is an example of a setting module configured to set access permissions for data already archived in a storage device according to user status. Access to data archived by the data archive module is made via an access command. The setting module analyzes the access command and determines whether the access command lacks proper user status. If so, then the access module does not access the archived data.

When access to data at the archive destination is not permitted (S900: NO), the access module 140 determines whether it is set to give an error for reference to that data or it is set to disregard the reference to that data (S930).

When it is set to disregard the reference (S930: Disregard), the access module 140 issues the input access command as it is (S935). As a result, if the access target is data at the archive destination, the access is disregarded and only data at the archive origin is accessed.

When it is set to given an error for the reference (S930: Give error), the access module 140 rewrites the access command input by the command input module 120 and executes the access command (S940). One example of the rewriting will be described later with reference to FIG. 10.

Next, based on the input access command and the input archive condition, the archive determining module 130 determines whether at least a part of data to be accessed according to the access command has already been archived in the second storage device 160 (S950). On condition that at least a part of data has already been archived in the second storage device 160 (S950: YES), the access module 140 notifies an error to the user who has input the access command (S960).

When access to data at the archive destination is permitted (S900: YES), the access module 140 rewrites the input access command and executes the access command (S910). In this case, the access module 140 further determines whether a read only attribute is set for the data archived in the second storage device 160 and access to the data is a request to update the data (S920). In such a case (S920: YES), the access module 140 moves the process to S960 to notify an error.

FIG. 10 shows one illustrative example of an access command which is rewritten by the access module 140. FIG. 10(a) shows an access command before being rewritten. This access command indicates a command to select from the table T1 a record with the column C1 which has a value greater than "1900-01-01" (i.e., newer date). An example of rewriting this access command will be described below.

With a check constraint set, a condition which a record to be read from each table satisfies is determined by the check constraint. Therefore, the access module 140 has only to rewrite a table to be accessed which is designated in the access command, and need not rewrite an access condition designated in the access command.

As shown in FIG. 10(b), for example, the access module 140 rewrites designation of a table to be accessed from "T1" to "SELECT*FROM USER1.T1 UNION ALL SELECT*FROM USER1.T1_WORM". As a result, each of the first storage device 150 and the second storage device 160 can be set as an access target.

As described above, the access module 140 can read, from among the data designated by the input access command, a record which does not satisfy an archive condition input at the time of data archiving from the first table, and a record which satisfies the archive condition from the second table.

In addition to the foregoing examples, when an operation to update a record or insert a record is permitted by the setting for the second storage device 160, the access module 140 may perform rewriting with an INSERT command or an UPDATE command as well as the SELECT command. It is to be noted that with the input command being the UPDATE command, when the contents of a column set as a data archive condition are to be changed, mere execution of the rewriting is not sufficient. Various specific examples are shown in FIG. 10(c), FIG. 10(d) and FIG. 10(e).

FIG. 10(c) shows an UPDATE command before rewriting. This access command indicates a command to set "2000-10-10" to the column C1 of a record with the column C2 having a value of "100" in the table T1. Because the record with the column C1 being 2000-10-10 needs to belong to the table T1, when there are corresponding records in T1_WORM, those records should be moved to T1. Therefore, the access module 140 rewrites this command to three commands shown in FIG. 10(d) to FIG. 10(f). As a result, as shown in FIG. 10(d), the rewritten command first sets "2000-10-10" to the column C1 of the record with the column C2 having a value of "100" in the table USER1.T1.

Then, because it is necessary to update corresponding data in T1_WORM and move the data in the table USER1.T1, the command shown in FIG. 10(e) should be executed. As a result, a corresponding record is acquired from USER1.T1_WORM, "2000-10-10" is set in the column C1 of the record, and the record is inserted in the table USER1.T1. It is assumed that the table T1 has only the columns C1, C2 and C3. Further, as shown in FIG. 10(f), unnecessary data is deleted from the table USER1.T1_WORM.

As shown in FIGS. 9 and 10, even when the input access command is for a database before data archiving, it is possible to adequately access a database including data after data archiving. Note that data read as a result of accessing may be cached in a memory area provided in a storage device like a RAM for later access to the same record.

Return to the description of FIG. 2, when the command input by the command input module 120 is not an access command (S260: NO), the control system 10 executes conventional processing according to the command (S270). When the received archive instruction is not a new archive instruction (S210: NO), the control system 10 determines whether the archive instruction creates a new table and archives data in that table, or adds data to a table at the archive destination where data has already been archived (S230).

On condition that data is to be added to the table of the archive destination (S230: NO), the data archive module 100 performs a process of reading a part of the database from the first storage device 150, and additionally archives it to the second storage device 160 (S240). The details of the process will be described with reference to FIG. 11.

Figure 11:
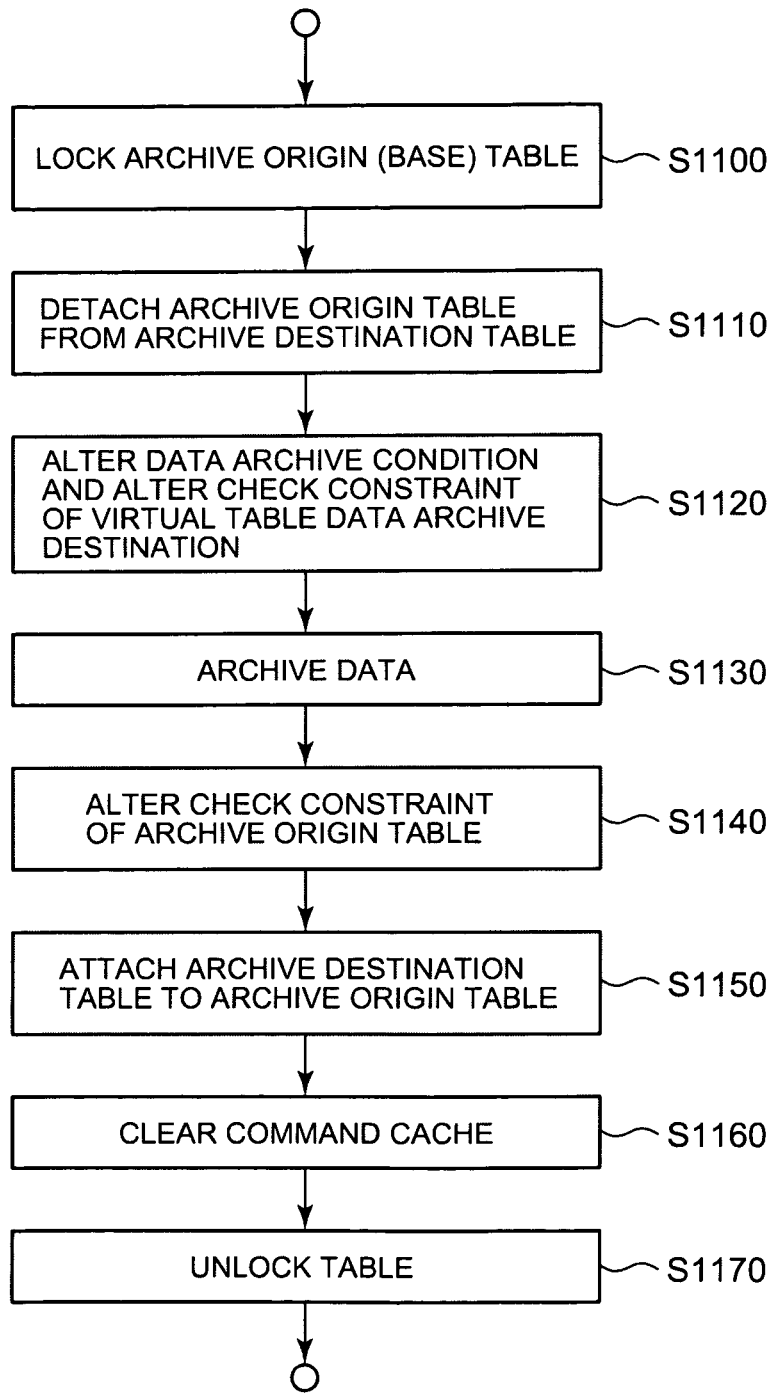
FIG. 11 shows the details of the flow of a process in S240 in FIG. 2, according to one embodiment of principles described herein.

FIG. 11 shows the details of the flow of the process in S240 in FIG. 2. The data archive module 100 first locks the database to inhibit access thereto by exclusive control (S1100). This is achieved by, for example, the following command.

lock table user1.t1 in exclusive mode;

Next, the data archive module 100 detaches an archive origin table (e.g., T1) which is a table of the data archive origin from an archive destination table (e.g., T1_WORM) which is a table of the data archive destination (S1110). This is achieved by, for example, setting the attach attribute stored in the control storage device 110 to invalid. The following is an example of the command.

alter table user1.t1 detach table user1.t1_worm;

Next, the data archive module 100 registers various kinds of information based on the received data archive instruction (S1120). For example, the data archive module 100 sets, in the second control module 145 as a new second check constraint, the logical sum of a condition already set in the second control module 145 as the second check constraint and an input condition for additional archive. The data archive module 100 generates the logical sum of the archive condition already stored in the control storage device 110 and a new archive condition, stores the logical sum in the control storage device 110, and stores association information associating the table T1 which is an archive origin with the table T1_WORM which is an archive destination in the control storage device 110. Further, the data archive module 100 may set a read only attribute to a virtual table at the archive destination as needed. Examples of the command are as follows.

alter table user1.t1 drop check c1;
alter table user1.t1 add constraint c1 check (c1>'2000-12-31');

FIG. 12 shows one illustrative example of information which maybe stored in the control storage device 110 and registered as a consequence of the process. "C1<=2000-12-31" is stored as an archive condition in the control storage device 110. A base table and an archive destination table are stored as association information in the control storage device 110 in association with each other. The base table is USER.T1, and the archive destination table is USER.T1_WORM. Further, a read only attribute and an attach validity attribute are stored in the control storage device 110. Because they are substantially identical to the specific examples of the control storage device 110 shown in FIG. 6, their descriptions will be omitted.

Returning to the description of FIG. 11, next, the data archive module 100 reads data in the database stored in the first storage device 150 which satisfies the input condition for additional archive, and archives the data in the second storage device 160 (S1130). An example of the command is as follows.

archive table user1.t1;

As discussed above, the archived data may be encrypted or compressed as needed. The data archive module 100 sets the logical sum of the condition already set as the first check constraint in the first control module 142 and negation of the input condition for additional archive, as a new first check constraint (S1140). Examples of the command are as follows.

alter table user1.t1 drop check c1;
alter table user1.t1 add constraint c1 check (c1>'2000-12-31');

Then, the data archive module 100 attaches a table of the archive destination to a table of the archive origin (S1150). Specifically, this may be achieved by setting the attach validity attribute of the control storage device to valid. An example of the command is as follows.

alter table user1.t1 attach table user1.t1_worm;

In addition, the data archive module 100 clears the command cache 125 (S1160). Examples of the command are as follows.

flush statement cache for table user1.t1;
flush statement cache for table user1.t1_worm;

Then, the data archive module 100 unlocks the database to permit access thereto (S1170). An example of the command is as follows.

commit;

FIGS. 13 and 14 show examples of the first storage device 150 and the second storage device 160 after data is additionally archived in the second storage device 160 from the first storage device 150 through the foregoing processes.

FIG. 13 shows an example of a database after additionally archiving data, which is stored in the first storage device 150 according to the embodiment. The first storage device 150 stores records with C1 values representing dates after 2000-12-31, and records with C1 values representing dates on and before 2000-12-31 are deleted from the first storage device 150. The first constraint storage module 146 stores "C1>2000-12-31" which is logical negation of the additional archive condition as the first check constraint.

FIG. 14 shows an example of a virtual table after additionally archiving data, which is stored in the second storage device 160 according to the embodiment. The second storage device 160 stores records with C1 values representing dates on and before 2000-12-31, and records with C1 values representing dates after 2000-12-31 are not archived in the second storage device 160. The second constraint storage module 148 stores "C1<=2000-12-31" which is the archive condition as the second check constraint.

Returning to the description of FIG. 2, on condition that the input archive instruction is an instruction to create a new table and archive data in that table (S230: YES), the data archive module 100 creates a new table in addition to, for example, the T1_WORM and archives data from the table T1 in that table (S240). The new table may be created in a third storage device 166. An example of the hardware configuration of the access module 140 in that case is shown in FIG. 15.

Figure 15:
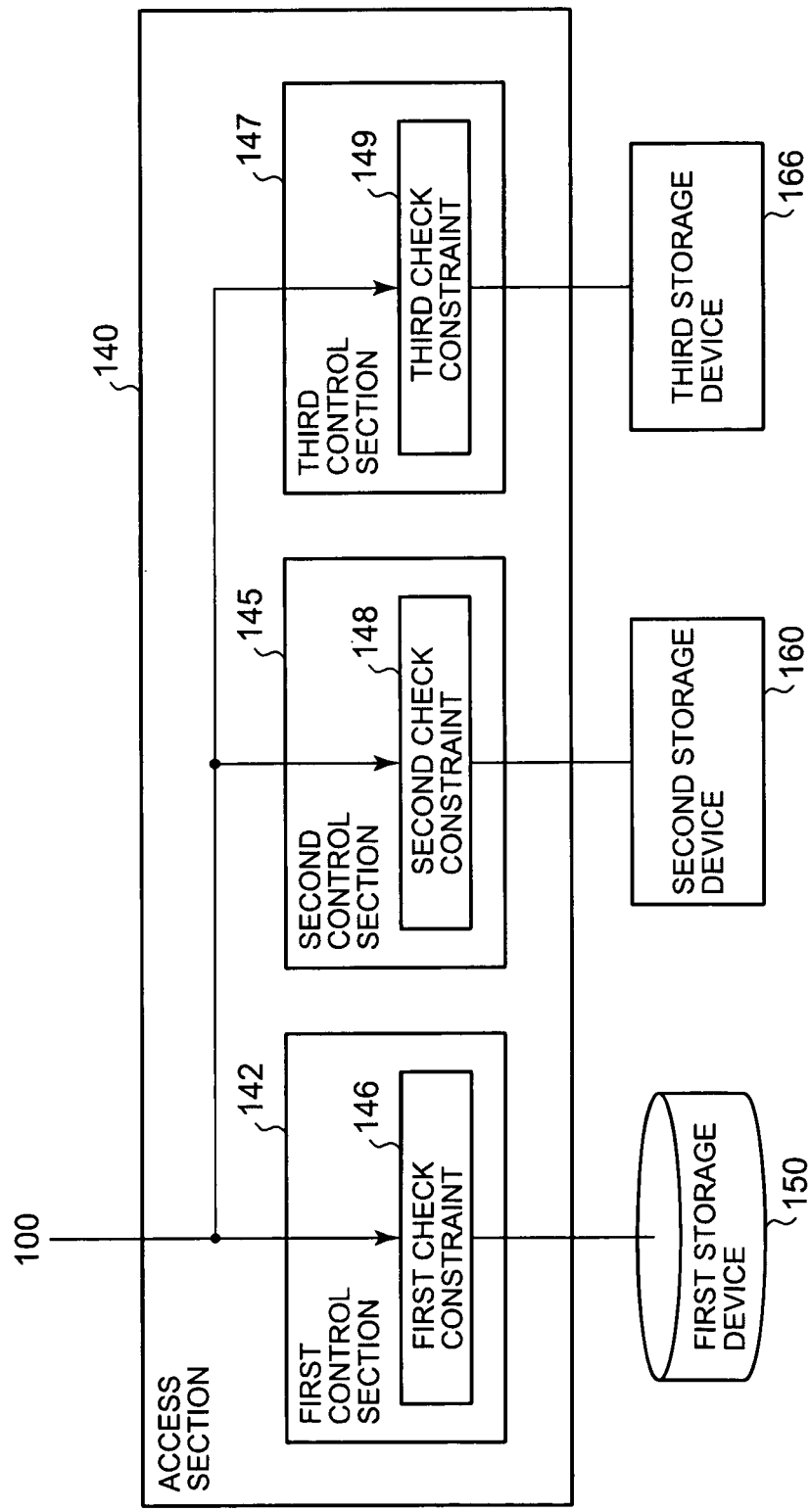
FIG. 15 shows another example of the access module, according to one embodiment of principles described herein.

FIG. 15 shows another illustrative example of the access module 140 according to the embodiment. In this example, the control system 10 may further include the third storage device 166 in addition to the configuration shown in FIG. 1. It is desirable that the third storage device 166 has a property different from that of the second storage device 160.

For example, the third storage device 166 may operate faster than the second storage device 160 in which case the latency of access is small and the throughput is high. The second storage device 160 may be less expensive and have a larger capacity than the third storage device 166. If the properties of a plurality of storage devices at the archive destination differ from one another, a user can select an appropriate storage device where data is to be archived according to the property of data to be archived (e.g., according to whether data is frequently accessed or has a large size).

In the case of this example, the access module 140 may further include a third control module 147 in addition to the configuration shown in FIG. 1. The third control module 147 may have a third check constraint storage module 149 for storing a check constraint corresponding to the third storage device 166. Because the rest of configuration of the control system 10 is substantially identical to that of the control system 10 explained with reference to FIG. 1, its description will be omitted.

Figure 16:
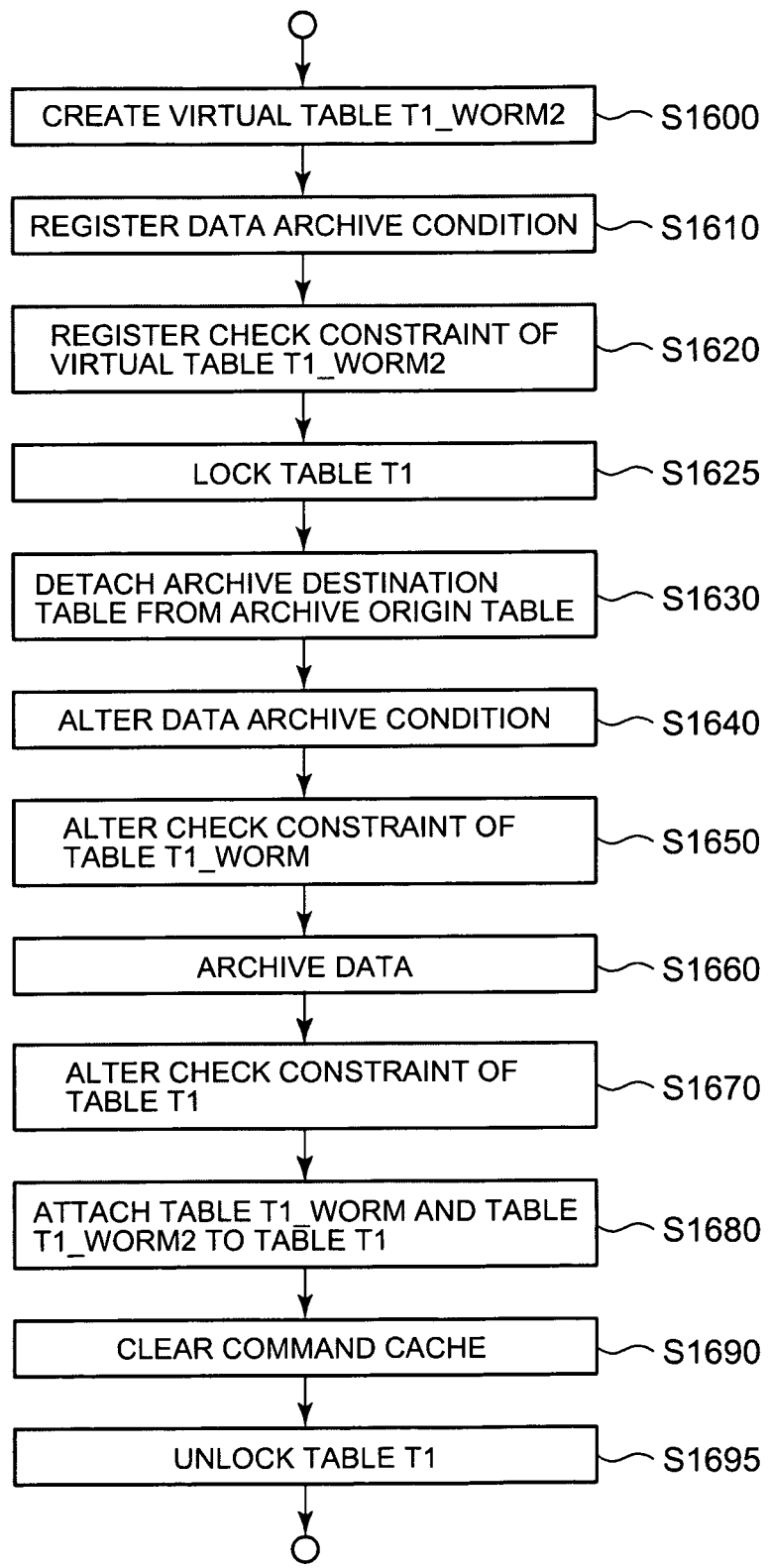
FIG. 16 shows the flow of the process of the control system to additionally archive data in another newly created table, according to one embodiment of principles described herein.

FIG. 16 shows an illustrative flow of the process of the control system 10 according to the embodiment to additionally archive data in another newly created table. First, the data archive module 100 creates a new virtual table T1_WORM2 in the third storage device 166 (S1600). Next, the data archive module 100 registers an archive condition input and other various kinds of information in the control storage device 110 (S1610). The registration process is achieved by, for example, the following command.

```
alter nickname user1.t1_worm add attach info (base_schema 'USER1',
    base_table 'T1', range_key 'C1', ending '1999-12-31',
    readonly 'Y');
```

Next, the data archive module 100 registers a check constraint of T1_WORM2 which is a new archive destination table in the third constraint storage module 149 (S1620). The registration process is achieved by, for example, the following command.

```
alter nickname user1.t1_worm2 add constraint c1 check
    (c1<='1999-12-3 1') not enforced;
```

Then, the data archive module 100 locks the archive origin table T1 to inhibit access thereto (S1625). The lock process is achieved by, for example, the following command.

lock table user1.t1 in exclusive mode;

Next, the data archive module 100 detaches T1_WORM2 which is an archive destination table from T1 which is an archive origin table (S1630). The detaching process is achieved by, for example, the following command.

alter table user1.t1 detach table user1.t1_worm;

Then, the data archive module 100 alters the data archive condition. The alteration process is achieved by, for example, the following command.

```
alter nickname user1.t1_worm alter attach info (starting '2000-01-01',
    ending '2004-12-31');
```

An example of information to be registered as a consequence of the process is shown in FIG. 17.

FIG. 17 shows an archive condition and association information after archiving data in another newly created table, which is stored in the control storage device 110 according to the embodiment. In this example, archive conditions are input in association with the archive destination tables T1_WORM and T1_WORM2, respectively. First, the archive condition corresponding to T1_WORM is that the value of the column C1 is a date on or before 1999-12-31, and an archive instruction is to archive a record satisfying the archive condition in the table T1_WORM2. The archive condition corresponding to T1_WORM2 is that the value of the column C1 is equal to or greater than 2001-01-01 and is equal to or smaller than 2004-12-31 and an archive instruction is to archive a record satisfying the archive condition in the table T1_WORM.

The control storage device 110 stores archive conditions for the table USER1.T1_WORM and USER1.T1_WORM2 which are the archive destination tables, respectively. The control storage device 110 stores "C1>=2000-01-01 AND C1<=2004-12-31" as an archive condition for USER1.T1_WORM and stores "C1<=1999-12-31" as an archive condition for USER1.T1_WORM2.

As in the example of FIG. 6, the control storage device 110 stores a read only attribute and attach validity attribute in association with each archive destination table. The read only attribute indicates an access restriction for the archive destination table. The attach validity attribute indicates if association by the association information is valid.

Returning to the description of FIG. 16, next, the data archive module 100 alters the check constraint for the archive destination table T1_WORM (S1650). An example of the alteration process is as follows.

```
alter table user1.t1_worm drop check c1;
alter nickname user1.t1_worm add constraint c1 check (c1>='2000-01-01'
    and c1<='2004-12-31') not enforced;
```

Then, the data archive module 100 reads data instructed to be archived from the first storage device 150 and archives the data in the third storage device 166 (S1660). A process thereafter is achieved by, for example, the following command.

archive table user1.t1;

Accordingly, data originally stored in the table T1 is distributed among and stored in the tables T1, T1_WORM and T1_WORM2 according to the input archive condition.

Then, the data archive module 100 alters the check constraint of the table T1 (S1670). The alteration process is achieved by, for example, the following commands.

```
alter table user1.t1 drop check c1;
alter table user1.t1 add constraint c1 check (c1>'2004-12-31');
```

Then, the data archive module 100 attaches each of the table T1_WORM and the table T1_WORM2 to the table T1 (S1680). This process is achieved by, for example, the following commands.

```
alter table user1.t1 attach table user1.t1_worm;
alter table user1.t1 attach table user1.t1_worm2;
```

Then, the data archive module 100 clears the command cache 125 (S1690). This process is achieved by, for example, the following command.

flush statement cache for table user1.t1;

Then, the data archive module 100 unlocks the table T1 to permit access thereto (S1695). This process is achieved by, for example, the following command.

commit;

FIG. 18 shows an example of a database after archiving data in another newly created table, which is stored in the first storage device 150 according to the embodiment. The first storage device 150 stores records with C1 values representing dates on and after 2005-01-01, and records with C1 values representing dates on and before 2004-12-31 are deleted from the first storage device 150. The first check constraint storage module 146 stores, as the first check constraint, "C1>=2005-01-01" which is logical negation of the logical sum of the archive conditions corresponding to T1_WORM and T1_WORM2, respectively.

FIG. 19 shows an example of a database after archiving data in another newly created table, which is stored in the second storage device 160 according to the embodiment. The second storage device 160 stores records with C1 values representing dates on and after 2001-01-01 and on and before 2004-12-31, and records with C1 values representing dates off the range are not archived in the second storage device 160. The second check constraint storage module 148 stores "C1>=2000-01-01 AND C1<=2004-12-31", which is the archive condition, as the second check constraint.

Figure 20:
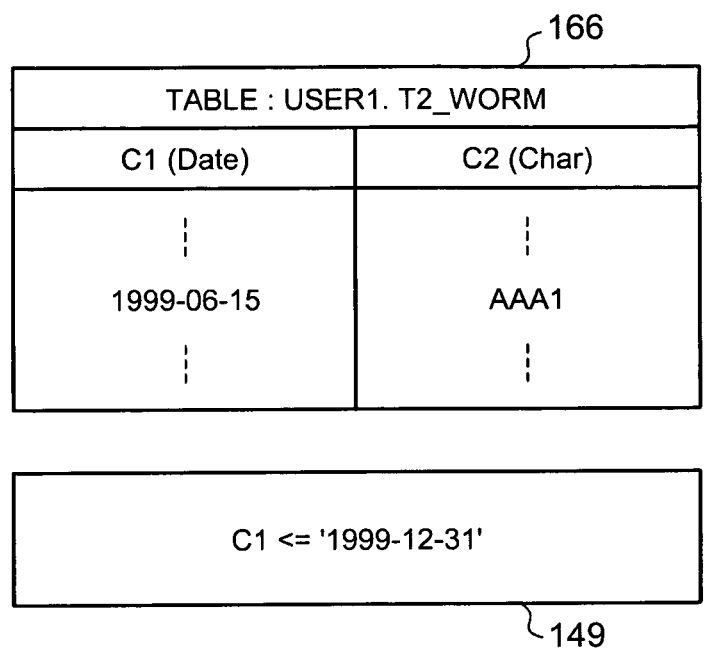
FIG. 20 shows an example of a database after archiving data in another newly created table, which is stored in a third storage device, according to principles described herein.

FIG. 20 shows an example of a database after archiving data in another newly created table, which is stored in the third storage device 166 according to the embodiment. The third storage device 166 stores records with C1 values representing dates on and before 1999-12-31, and records with C1 values representing dates off the range are not archived in the third storage device 166. The third check constraint storage module 149 stores "C1<=1999-12-31", which is the archive condition, as the third check constraint.

According to the control system 10 of the present specification, as described above with reference to FIGS. 15 to 20, data stored in a database can be archived part by part in a plurality of storage devices having different properties. This makes it possible to separately use the storage devices according to the use of data, like storing data with a high access frequency in a storage device which operates relatively fast and storing data with a low access frequency in a storage device which has a low operation speed but has a large capacity.

Figure 21:
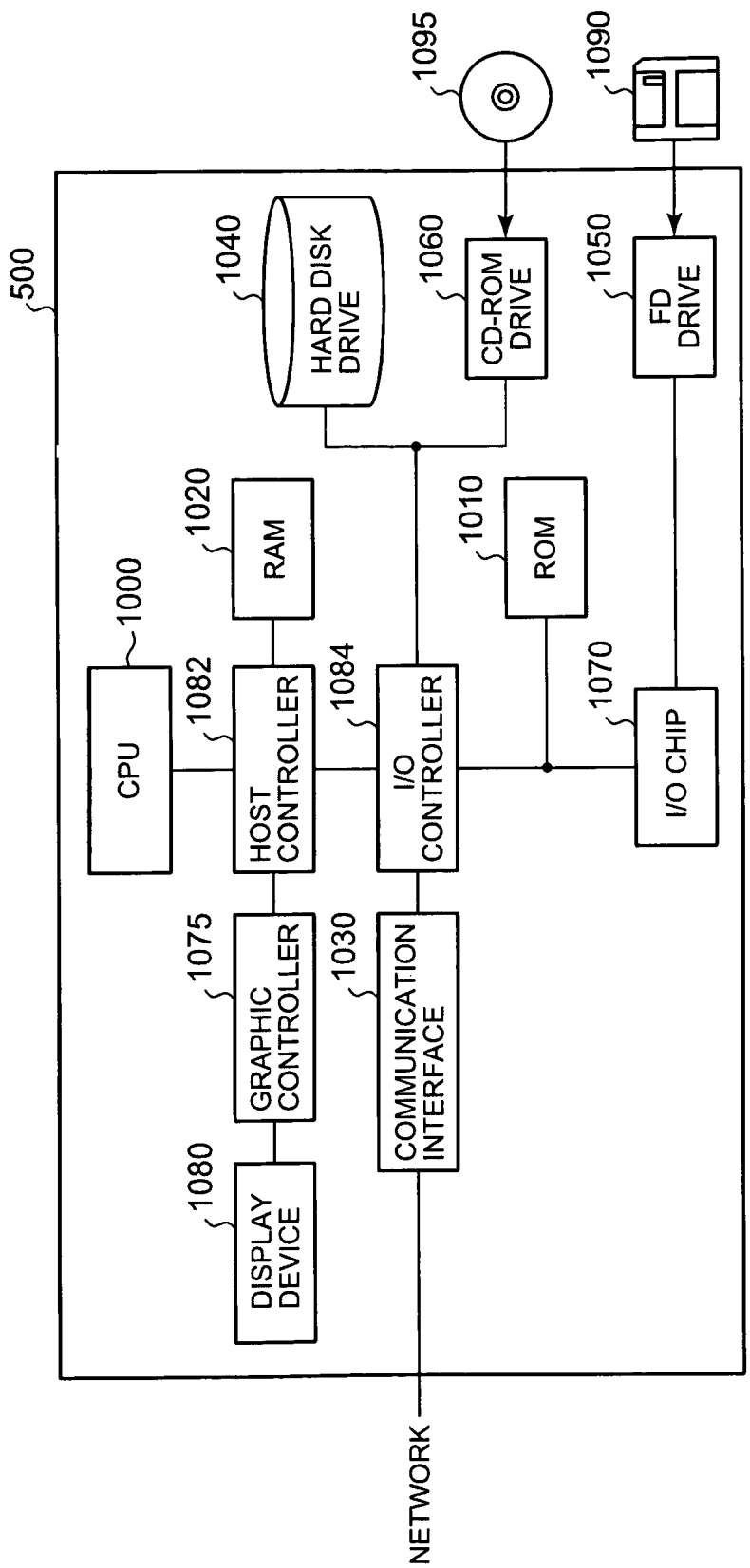
FIG. 21 shows an example of the hardware configuration of a computer which functions as the control system, according to principles described herein.

FIG. 21 shows one example of the hardware configuration of a computer 500 which functions as the control system 10 according to the embodiment. The computer 500 includes a CPU peripheral module that has a CPU 1000, a RAM 1020 and a graphics controller 1075, which are mutually connected by a host controller 1082. The computer 500 also includes an input/output module that has a communication interface 1030, a hard disk drive 1040, and a CD-ROM drive 1060, which are connected to the host controller 1082 by an input/output controller 1084. The computer 500 further includes a legacy input/output module that has a ROM 1010, a flexible disk drive 1050 and an input/output chip 1070, which are connected to the input/output controller 1084.

The host controller 1082 connects the RAM 1020 to the CPU 1000 and the graphics controller 1075, which access the RAM 1020 at a high transfer rate. The CPU 1000 operates to control the individual modules based on programs stored in the ROM 1010 and the RAM 1020. The graphics controller 1075 acquires image data which is created by the CPU 1000 or the like on a frame buffer provided in the RAM 1020. Instead, the graphics controller 1075 may include a frame buffer inside to store image data created by the CPU 1000 or the like.

The input/output controller 1084 connects the host controller 1082 to the communication interface 1030, the hard disk drive 1040 and the CD-ROM drive 1060, which are relatively fast input/output devices. The communication interface 1030 communicates with an external device over a network. The hard disk drive 1040 stores programs and data which the computer 500 uses. The CD-ROM drive 1060 reads a program or data from a CD-ROM 1095, and provides it to the RAM 1020 or the hard disk drive 1040.

The input/output controller 1084 is connected with the ROM 1010, and relatively slow input/output devices, such as the flexible disk drive 1050 and the input/output chip 1070. The ROM 1010 stores a boot program which is executed by the CPU 1000 when the computer 500 is activated, and other programs which depend on the hardware of the computer 500. The flexible disk drive 1050 reads a program or data from a flexible disk 1090, and provides it to the RAM 1020 or the hard disk drive 1040 via the input/output chip 1070. The input/output chip 1070 connects the flexible disk 1090 and various kinds of input/output devices via, for example, a parallel port, a serial port, a keyboard port, a mouse port and so forth.

The program provided to the computer 500 is stored in a recording medium, such as the flexible disk 1090, the CD-ROM 1095 or an IC card and provided by a user. The program is read from the recording medium via the input/output chip 1070 and/or the input/output controller 1084, and is installed on the computer 500 and executed. Because the operations which the program causes the computer 500 or the like to execute are the same as the operations of the control system 10 which have been explained with reference to FIGS. 1 to 14, their descriptions will be omitted.

The program described above may be stored in an external storage medium. An optical recording medium, such as DVD or PD, a magnetooptical recording medium, such as MD, a tape medium, a semiconductor memory, such as an IC card, or the like can be used as the storage medium in addition to the flexible disk 1090 or the CD-ROM 1095. A storage device, such as a hard disk drive or RAM, provided at a server system connected to a private communication network or the Internet can be used as a recording medium to provide the computer 500 with the program over the network.

The control system 10 according to the embodiment can directly read data transferred to a WORM medium or the like without restoring the data to the original hard disk drive or the like. This can shorten the access waiting time and achieve efficient processing, and can allow a large-scale database to be constructed at a low cost by using an inexpensive WORM medium or the like which has a relatively large capacity. Even when data is read from a WORM medium or the like, an access command can be a command for the conventional hard disk drive. This can eliminate the need for modifying an SQL application program already developed for a hard disk drive.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A system for controlling access to a database, comprising one or more processors and memories that comprise:
   a data archive module configured to automatically archive data in a database stored in a first storage device into a second storage device, said automatic archival of said data satisfying an archive condition; said archive condition being input with said data and being associated with said data;
   a command input module configured to accept an input of an access command to said database;
   an archive determining module configured to determine whether data to be accessed in response to said access command has already been archived in said second storage device, based on said access command and said archive condition; and
   an access module configured to access data included in said database or data archived in said second storage device according to said access command based on said determination made by said archive determining module.

2. The system of claim 1, further comprising a setting module configured to set access permissions for data already archived in said second storage device according to user status;
   wherein access to data archived by said data archive module is made via a said access command; said setting module analyzing said access command and determining that said access command lacks proper user status, then said access module does not access said archived data.

3. The system of claim 1, further comprising a control storage module configured to store control data,
   wherein said data archive module stores said archive condition input to archive data in said second storage device in said control storage module, and
   said access module determines whether data to be accessed in response to said access command satisfies said archive condition stored in said control storage module, based on said archive condition and said access command.

4. The system of claim 1, wherein said database stored in said first storage device comprises a first table,
   said data archive module being configured to read and store a part of said first table as a new second table in said second storage device, and delete said part of said first table from said database.

5. The system of claim 4, wherein said access module accesses said database or said data already archived by rewriting designation of a table to be accessed in said access command from said first table to a table which is made by coupling said first table and said second table together.

6. The system of claim 4, further comprising a command cache storing an access command input in a past and a compiled command which is a command prepared by compiling said access command and issued to said database by said access module in association with each other.

7. The system of claim 6, wherein in accordance with further acceptance of an input of an archive condition to be satisfied by data to be additionally archived in said second storage device from said database, said data archive module further archives said data in said database which satisfies said archive condition in said second storage device, and clears said command cache.

8. A method of controlling access to a database, comprising:
   autonomously archiving data within a database from a first storage device into a second storage device, according to an archive condition; said archive condition being input in conjunction with said data and being associated with said data;
   accepting an input of an access command to said database;
   determining whether data to be accessed in response to said access command input has already been archived in said second storage device, based on said access command and said archive condition; and
   accessing, by a processor, data included in said database or data archived in said second storage device according to said access command based on said determination.

9. The method of claim 8, further comprising:
   setting access permissions for data already archived in said second storage device according to user status;
   accessing data archived by a data archive module by inputting a said access command;
   a setting module analyzing said access command; if said setting module determines that said access command lacks proper user status, then
   an access module does not access said archived data.

10. The method of claim 9, further comprising
   storing said archive condition in a control storage module configured to store control data;

determining whether data to be accessed in response to said access command satisfies said archive condition stored in said control storage module, based on said archive condition and said access command.

11. The method of claim 9, further comprising compiling and storing said access command in a command cache.

12. The method of claim 9, wherein archiving said data further comprises removing a part of a first table from said first storage device and placing said part in a second table in said second storage device.

13. The method of claim 12, further comprising accessing said database by said access module accesses by creating an access table based on said access command by coupling said first table and said second table together.

14. The method of claim 13, further comprising
preparing a compiled command by compiling said access command;
storing said access command and said compiled command in a command cache; and
issuing said compiled command to said database by said access module.

15. The method of claim 14, further comprising:
accepting an input of an archive condition; said archive condition defining a criteria for moving designated data within said database to said second storage device;
archiving said designated data by said data archive module to said second storage device upon fulfillment of said criteria; and
clearing said command cache.

16. The method of claim 15, further comprising
determining whether data to be accessed in response to said access command satisfies a first preset check constraint; if said first preset check constraint is satisfied, then
permitting access to said first table on condition that said first check constraint is satisfied;
determining whether data to be accessed in response to said access command satisfies a second preset check constraint; if said second preset check constraint is satisfied, then
permitting access to said second table on condition that said second check constraint is satisfied.

17. The method of claim 16, further comprising:
accepting said archive condition by said data archive module;
archiving data designated by said archive condition upon fulfillment of said archive condition to said second storage device; and then
setting a logical sum as said second check constraint and said condition input to additionally archive said data, newly as said second check constraint, and sets a logical sum of said condition already set as said first check constraint and negation of said condition input to additionally archive said data, newly as said first check constraint.

18. The method of claim 8, further comprising
setting a read only attribute to data segment archived in said second storage device based on a received instruction, and
inhibiting otherwise authorized access to said data segment until said read only attribute is set to said archived data.

19. The method of claim 8, further comprising a third storage device, wherein data from said first or second storage devices is archived in said third storage device, said data satisfying an archive condition.

20. A computer program product for controlling access to a database, the computer program product comprising:
a non-transitory computer usable storage medium having computer usable program code embodied therewith, the computer usable program code comprising:
computer usable program code configured to store data in a database in a first storage device within a database, said data being accompanied by an archive condition, said archive condition defining at least one criterion to be met before archiving said data in a second storage device;
computer usable program code configured to accept an input of an access command to said database;
computer usable program code configured to determine whether data to be accessed in response to said access command input has already been archived in said second storage device, based on said access command and said archive condition; and
computer usable program code configured to access data included in said database or data archived in said second storage device according to said access command based on said determination made by said determining step.

* * * * *